US008509388B2

(12) United States Patent
Barreiro

(10) Patent No.: US 8,509,388 B2
(45) Date of Patent: Aug. 13, 2013

(54) CALLER IDENTIFICATION PROTOCOL FOR PROVISIONING A DEVICE

(75) Inventor: Lionel P. Barreiro, Annoeullin (FR)

(73) Assignee: Cisco Technology, Inc., San Jose, CA (US)

( * ) Notice: Subject to any disclaimer, the term of this patent is extended or adjusted under 35 U.S.C. 154(b) by 1829 days.

(21) Appl. No.: 11/539,365

(22) Filed: Oct. 6, 2006

(65) Prior Publication Data
US 2008/0084979 A1    Apr. 10, 2008

(51) Int. Cl.
*H04M 1/24* (2006.01)
*H04M 3/08* (2006.01)
*H04M 3/22* (2006.01)
*H04L 12/66* (2006.01)

(52) U.S. Cl.
USPC ................................... 379/15.03; 370/352

(58) Field of Classification Search
USPC .................. 379/1.04, 15.03, 201.05, 201.12; 370/352; 375/220, 222, 231
See application file for complete search history.

(56) References Cited

U.S. PATENT DOCUMENTS

| 6,404,868 | B1 * | 6/2002 | Beamish et al. | 379/142.01 |
| 2003/0053443 | A1 * | 3/2003 | Owens | 370/352 |
| 2004/0136394 | A1 * | 7/2004 | Onno et al. | 370/438 |

OTHER PUBLICATIONS

ETSI Technical Report, Public Switched Telephone Network (PSTN); Protocol over the local loop for display and related services; Proposed enhancements and maintenance of existing standards, ETSI TR 101 292 v. 1.1.2 (1999-09), 18 pages.

* cited by examiner

*Primary Examiner* — Quoc D Tran
(74) *Attorney, Agent, or Firm* — Haynes and Boone, LLP

(57) ABSTRACT

In one embodiment, an advantageous system, apparatus, and method are provided for automatically and remotely pre-provisioning or provisioning a customer's digital subscriber line device via the public switched telephone network (PSTN) or the integrated services digital network (ISDN) using a caller identification (CID) sequence in a multiple data message format (MDMF).

22 Claims, 5 Drawing Sheets

Message type: 0x70
VCI Parameter Type: 0x1
VPI Parameter Type: 0x2
VCI: 0x8
VPI: 0x35

CALLER IDENTIFICATION PROTOCOL FOR PROVISIONING A DEVICE

TECHNICAL FIELD

The present invention relates generally to network equipment management, and more particularly, to a system, apparatus, and method for remote provisioning of customer premises equipment (CPE).

BACKGROUND

Remote provisioning of an asymmetric digital subscriber line (ADSL) CPE, such as an access point or router, has been previously accomplished by large infrastructure build outs of specific servers and protocols, such as TR-69. However, previous provisioning methods have required that the device be connected to the Internet and also be pre-provisioned with the provisioning server IP address, which requires the creation of a specific stock keeping unit (SKU) number or unique numeric identifier for each service provider. This is not an issue when the service provider draws high volumes, but such a method becomes problematic when the volumes are low and manual pre-provisioning of the units is required, which is neither convenient nor cost-effective.

Thus, improved means and methods to enable the service provider to remotely pre-provision or provision a DSL device is highly desirable.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

The present invention provides an advantageous system, apparatus, and method for automatically and remotely pre-provisioning or provisioning a customer's digital subscriber line (DSL) device (e.g., a gateway, router, modem, or access point that is connected by DSL) via the public switched telephone network (PSTN) (Annex A) or the integrated services digital network (ISDN) (Annex B) using a caller identification (CID) sequence in a multiple data message format (MDMF). Advantageously, the present invention allows for cost-effective and efficient pre-provisioning or provisioning of a DSL device that does not have access to the Internet but is connected to a telephone line.

Figure 1:
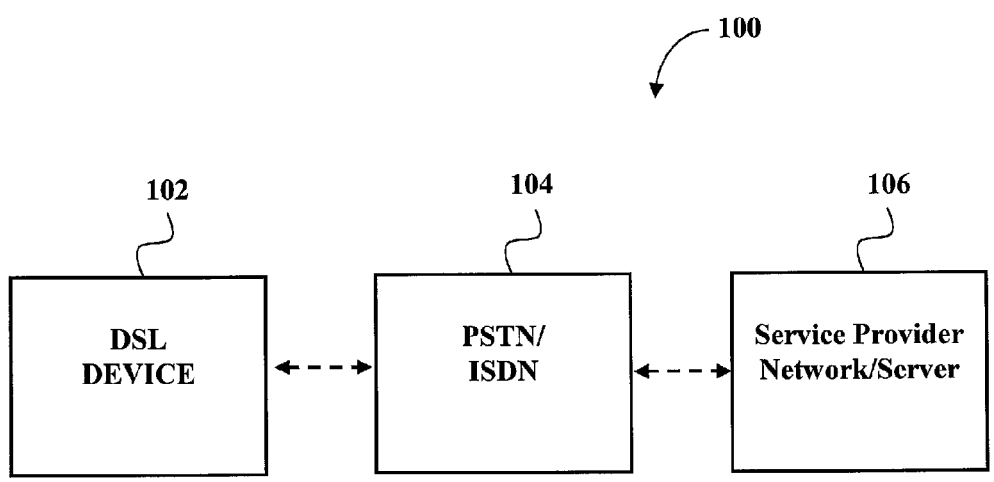
FIG. 1 illustrates an example system for provisioning a DSL apparatus using a caller identification (CID) protocol in accordance with an embodiment of the present invention.

Referring now to FIG. 1, a block diagram of an example system 100 for automatically pre-provisioning or provisioning a DSL device 102 using a CID protocol is illustrated in accordance with an embodiment of the present invention. System 100 includes DSL device 102 operably coupled to PSTN/ISDN 104. A service or equipment provider (SP) 106, which may include a provider computer and/or a database, is also operably coupled to PSTN/ISDN 104. As DSL device 102 can be connected to SP 106 via the PSTN/ISDN line, the SP has a unique and secure way to access and provision the DSL device.

DSL device 102 may be operably coupled to PSTN/ISDN 104 via an interface, including in one example a receptacle for receiving a telephone cable with a plug. DSL device 102 may include means for joining two networks together and may serve as an entrance to a network, such as PSTN or ISDN. In one example, DSL device 102 may be implemented completely in software, completely in hardware, or as a combination of the two. In a further example, DSL device 102 may be able to support wireless fidelity (WiFi) in general, and the IEEE 802.11 wireless networking standard in particular. DSL device 102 may also include a variety of typical routers, switches, and/or hubs, and in one example can support the 10/100/1000 Base-T standards, automatic negotiation, and automatic MDIX. DSL device 102 is described in more detail below with respect to FIG. 2.

PSTN/ISDN 104 is a concentration of public circuit-switched telephone networks, and may include both analog and digital telephone systems.

SP 106 may include a variety of computers, servers, and/or networks, and in one example may include a general or special purpose processor, with network capabilities. SP 106 functions to generate and transmit CID sequences including pre-configuration or configuration information to a customer's DSL device through PSTN/ISDN 104. The pre-configuration/configuration information may generally include DSL device parameters, such as DSL settings that will allow the device to connect to the Internet. In one example, these parameters may include: a virtual channel identifier (VCI); a virtual path identifier (VPI); a multiplexing LLC or VCMUX; and encapsulation (e.g., PPPoA, PPPoA, 1483 Bridged, 1483 Routed, etc.).

Figure 3:
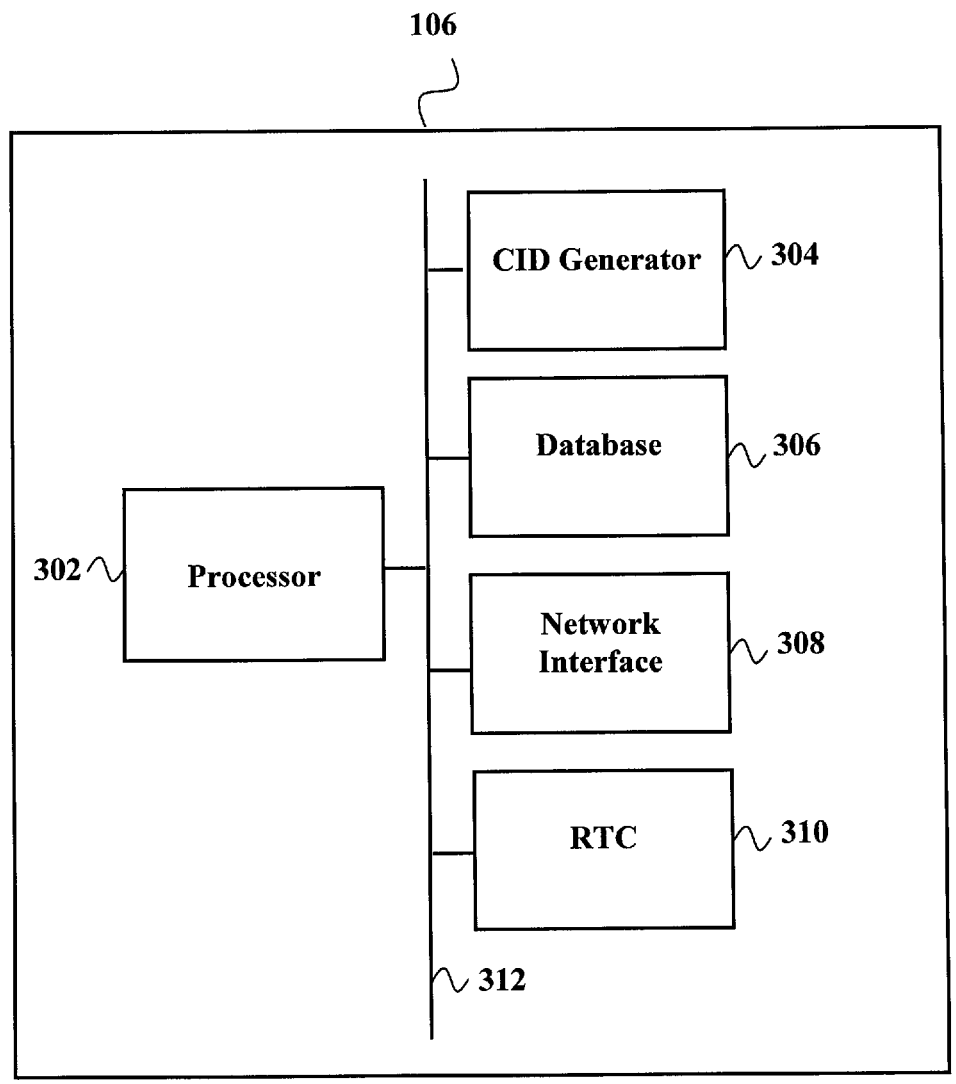
FIG. 3 illustrates a block diagram of an example service provider server/network in accordance with an embodiment of the present invention.

Referring now to FIG. 3 in conjunction with FIG. 1, a block diagram of an example service provider server/network is illustrated in accordance with an embodiment of the present invention. In one example, SP 106 comprises a processor 302, a CID generator 304, a database 306, a network interface 308, and a real time clock 310, which are interconnected by a bus 312. In one example, SP 106 may send CID sequences based upon a time schedule utilizing real-time clock 310.

In one embodiment, the CID sequence is generated by CID generator 304 following frequency-shift keying (FSK) or dual-tone multiple-frequency (DTMF) standards. The CID sequence may be defined by a specific or unique "Message Type" ID or set of IDs that is/are not recognized by the telephone, such as those not defined in the ETSI TR 101 292 standard. Since the ID will be seen as "undefined/unknown" by the telephone, the CID sequence will not be recognized as valid and accordingly will be ignored by the telephone. However, the CID detector of the DSL device will recognize the Message Type ID as a provisioning message type.

In one example, the telephone may recognize the following "Message Types": CALL SETUP MESSAGE (80H), MESSAGE WAITING INDICATOR (82H), ADVICE OF CHARGE (86H), and SHORT MESSAGE SERVICE (89H), as defined in the ETSI TR 101 292 standard. Accordingly, in this embodiment, a Message Type ID that is not 0x80, 0x82, 0x86 or 0x89 will be rejected by the telephone but recognized by the CID detector, such that the provisioning sequence is transparent for the user.

In one example, the configuration information is sent using the CID multiple data message format (MDMF), which supports multiple data types, such as name, number, data, and time information. MDMF is structured in such a way that new types of data, such as provisioning information, can be easily added. Furthermore, the amount of data that can be sent via the present invention to the DSL device is theoretically unlimited, and thus, the present invention may be used to not only pre-provision the device, such as a TR-69 device, but to fully provision the device. Accordingly, CID generator 304 is able to define a new Message Type and include associated parameters defining the provisioning data.

Figure 4:
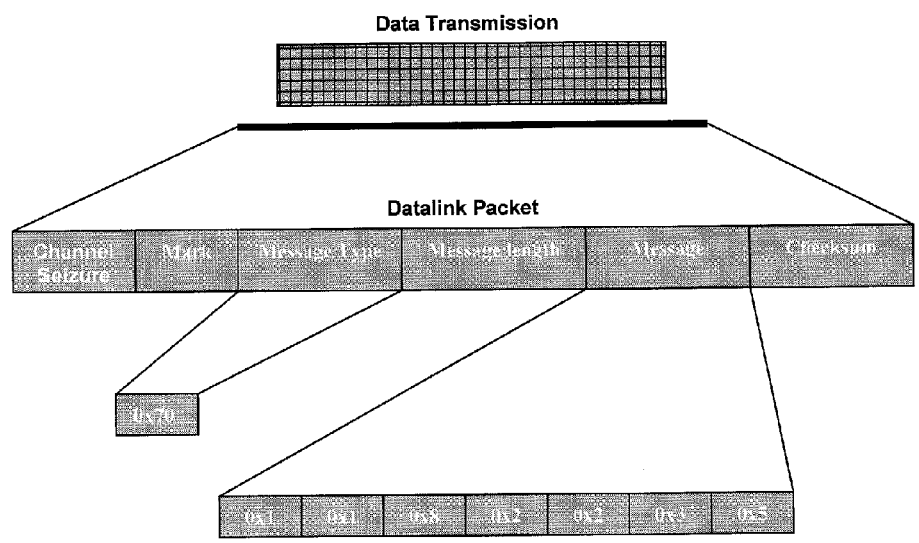
FIG. 4 illustrates a diagram of an example CID sequence in accordance with an embodiment of the present invention.

FIG. 4 illustrates a diagram of an example CID sequence in accordance with an embodiment of the present invention. In this example, with no intent to limit the invention thereby, the Message Type ID is 0x70, the VCI Parameter Type is 0x1, the VPI Parameter Type is 0x2, the VCI is 0x8, and the VPI is 0x35.

Advantageously, the present invention will not hinder the customer from using the PSTN/ISDN line for telephone calls, as the unique CID sequence including the pre-configuration or configuration information will not alter the customer's ability to make outgoing calls or receive incoming calls. The customer's telephone also will not ring or otherwise show CID information when receiving the unique CID sequence since the CID sequence may be provided, as noted above, such that it will be considered by the telephone as an unknown or false CID sequence. If a user was using a telephone when the provisioning action began, the line will be in a busy state and the service provider will not send the CID sequence in this case. If a call is received while provisioning, the call should take priority and provisioning should stop until the line becomes "off hook" again.

Furthermore, a generic SKU may be advantageously used for all SPs such that no pre-configuration is required. To utilize a single SKU, a universal data access arrangement (DAA) may be implemented in one embodiment so that various electrical characteristics of PSTN/ISDN lines for multiple countries may be matched per regulatory requirements. If the CID sequence is transmitted in an "On Hook" state, a universal DAA may not be needed.

Figure 2:
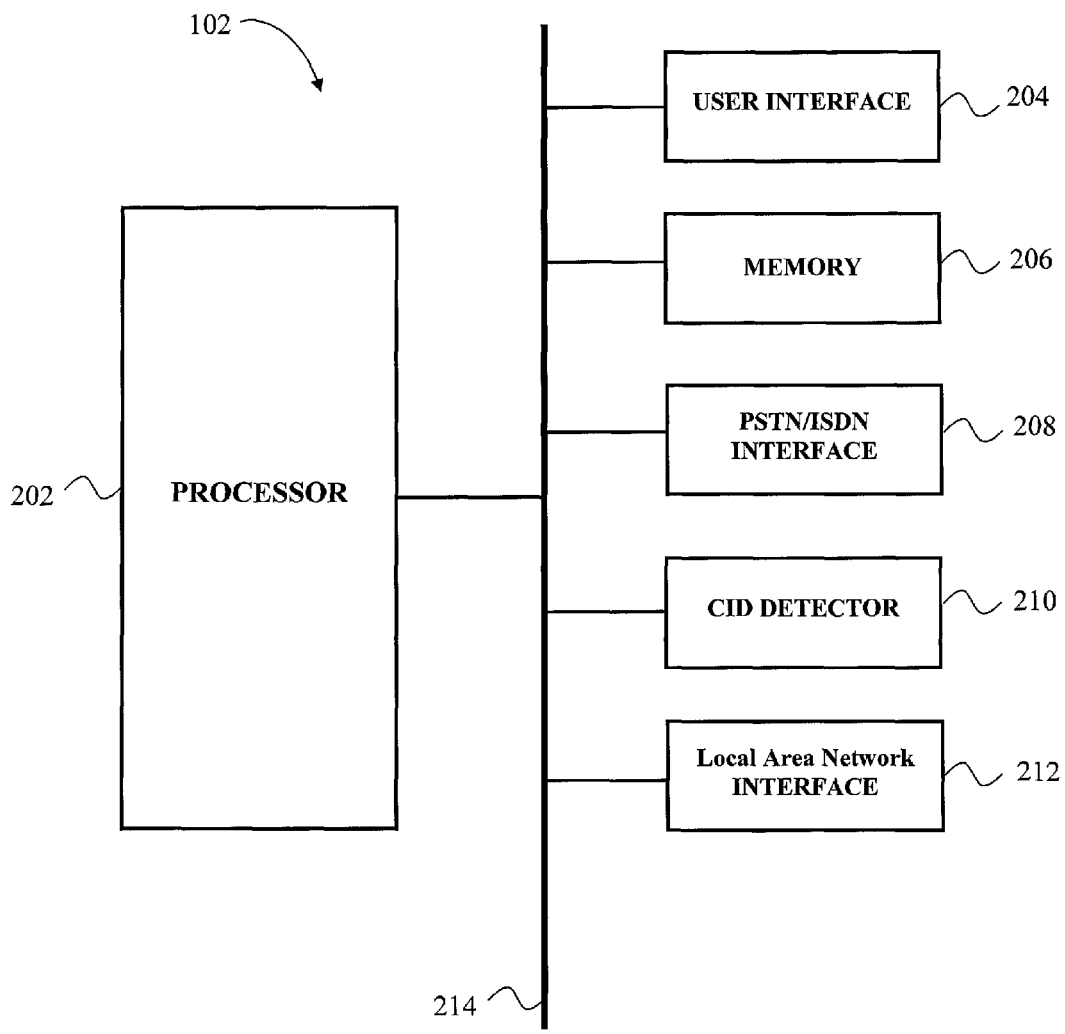
FIG. 2 illustrates a block diagram of an example DSL apparatus in accordance with an embodiment of the present invention.

Referring now to FIG. 2 in conjunction with FIGS. 1 and 3, a block diagram of an example DSL device is illustrated in accordance with an embodiment of the present invention. DSL device 102 includes a processor 202 operably coupled via a bus 214 to: a user interface 204 via an input/output port; a memory 206 (e.g., SDRAM or flash memory) via a memory interface; a PSTN/ISDN interface 208 including a receptacle for receiving a telephone line plug; a CID detector 210; and a LAN interface 212 (e.g., a 10/100/1000 Base-T Ethernet port) via a MII interface.

Processor 202 is a high performance, highly integrated, and highly flexible system-on-chip (SOC) in one example. Processor 202 may include a variety of processors, and in one example are available from Intel Corporation of Santa Clara, Calif. Conventional processors are applicable and may also be used.

User interface 204 is operably coupled to processor 202 for displaying DSL device functionality to the user, and in one example includes an interface to allow the user to choose the country/region in which the DSL device is located. In yet another example, user interface 204 may include a light emitting diode (LED) system, which may be used to indicate different functions or the status of DSL device 102. For example, an LED may be on when the apparatus is powered on and ready for use or off when the device is powered off. An LED may blink when the device is booting up or shutting down or receiving a CID sequence. An LED may also indicate connection to and/or operation with a LAN or a WAN. In one embodiment, firmware and hardware may be used in conjunction with the LED(s) to indicate status of the DSL device, connection to and operation with the LAN, the WAN, and other functions of the device.

Memory 206 may include a variety of memories, and in one example includes SDRM and flash memory. In one example, memory 206 may be used to store passwords, server IP addresses, provisioning data, and/or a CID protocol for receiving and processing a unique CID sequence including provisioning information from the service provider server. The provisioning information may then be used to provision the DSL device.

PSTN/ISDN interface 208 includes a receptacle for receiving a telephone line plug, such as a RJ-11/RJ-45 or RJ-14 port, and also allows for transmitting and/or receiving digital and/or analog signals, and in the context of the present invention is able receive a unique CID sequence from a service provider server through PSTN/ISDN 104.

CID detector 210 detects the unique CID sequence from the service provider server and is able to either itself process the CID sequence or send the data to processor 202 for processing of the CID sequence for pre-configuration or configuration information. In one example, CID detector 210 includes different filters, one of which may be selected by the customer based upon the country/region where the CID sequence is being received. In one example, CID detector 210 includes a FSK/DTMF detector implemented using Goertzel filters. The CID detector may be started automatically when the DSL device is powered on and has not yet been configured or by user request via a button on a Wizard or HTML interface.

LAN interface 212 provides for connection of DSL device 102 to a LAN, and in one example supports the 10/100/1000 Base-T standards, automatic negotiation, and automatic medium dependent interface crossover (MDIX). In a further example, LAN interface 210 includes a Ethernet RJ-45 port.

In one embodiment, DSL device 102 may further include an ADSL filter and an opto-resistor ring detector if the CID FSK and ring signals are not of sufficient strength when received by the DSL device 102.

In yet another embodiment of the present invention, DSL device 102 may include an acknowledgement feedback mechanism that acknowledges/confirms to the SP via PSTN/ISDN 104 that the configuration change was actually initiated and accepted.

Figure 5:
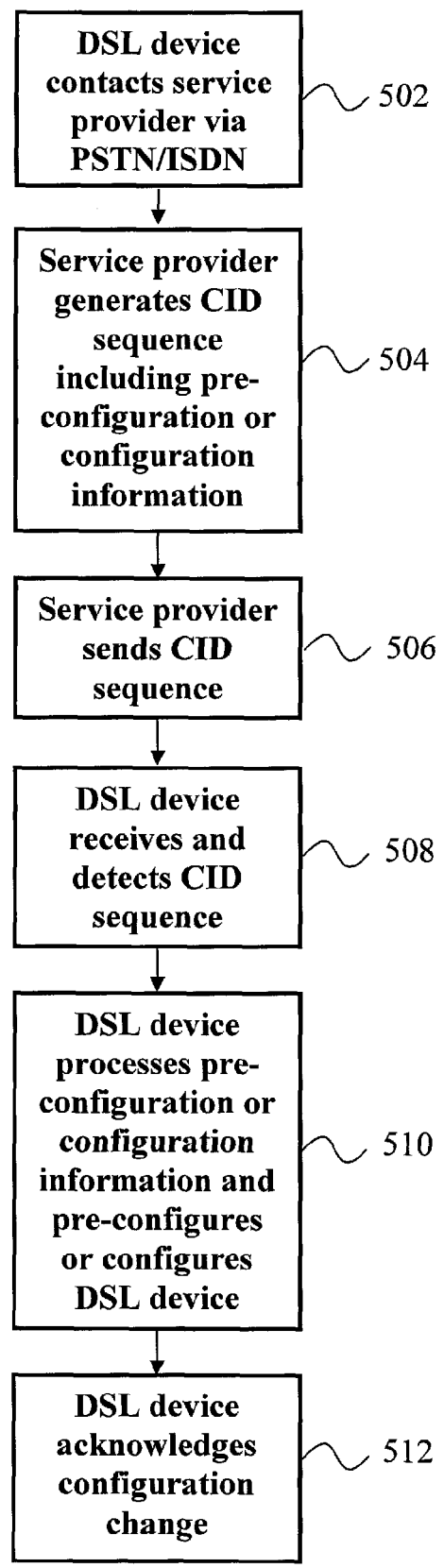
FIG. 5 illustrates an example method for provisioning a DSL apparatus using a CID protocol in accordance with an embodiment of the present invention.

Referring now to FIG. 5 in conjunction with FIGS. 1 through 4, an example method for provisioning a DSL device using a CID protocol is illustrated in accordance with an embodiment of the present invention.

At step 502, DSL device 102 is connected to the SP server or network 106 via a PSTN/ISDN line, and the customer contacts the SP via PSTN/ISDN 104. The contact mechanism may originate from or be initiated by the user/subscriber in various ways. For example, the user may select a button on the DSL device's user interface, or the user may select an option in a setup wizard for the DSL device via an attached computer.

At step 504, SP 106 generates a unique CID sequence including pre-configuration or configuration information using CID generator 304, as described above.

At step 506, SP 106 sends the CID sequence to DSL device 102 via PSTN/ISDN 104. SP 106 may send the CID sequence on a time interval or according to a schedule.

At step 508, DSL device 102 receives the CID sequence through PSTN/ISDN interface 208, and detects the unique CID sequence via CID detector 210.

At step 510, DSL device 102 processes the pre-configuration or configuration information with processor 202 to pre-configure or configure DSL device 102.

Optionally, at step 512, DSL device 102 may acknowledge or confirm with the SP the configuration change. Various means and methods may be used to acknowledge or confirm provisioning. In one example, a F5 OAM loopback test may be used to verify that the ATM settings have been applied successfully. Then a check may be made whether the DSL device has logged in successfully into the server. If there is a need to verify other parameters then the SP can remotely access the device and download its configuration file.

Embodiments described above illustrate but do not limit the invention. It should also be understood that numerous modifications and variations are possible in accordance with the principles of the present invention. Accordingly, the scope of the invention is defined only by the following claims.

What is claimed is:

1. An apparatus comprising:
   a PSTN/ISDN interface for operably coupling the apparatus to a service provider network via a PSTN/ISDN line; and
   a caller identification detector (CID detector) operably coupled to the PSTN/ISDN interface,
   wherein the CID detector is configured to receive a caller identification sequence (CID sequence) that includes pre-configuration or configuration data for the apparatus from the service provider network,
   wherein the CID detector is further configured with a filter based upon a country/region where the CID sequence is being received,
   wherein the CID sequence includes settings allowing the apparatus to connect to the Internet, and
   wherein the CID sequence includes a Message Type ID recognizable as a provisioning message type by the CID detector and not recognizable as valid by a telephone on the PSTN/ISDN line.

2. The apparatus of claim 1, wherein the caller identification sequence is formatted using the multiple data message format (MDMF).

3. The apparatus of claim 1, wherein the caller identification sequence is associated with a Message Type ID not defined in the ETSI TR 101 292 standard.

4. The apparatus of claim 1, wherein the caller identification sequence includes a server IP address.

5. The apparatus of claim 1, wherein the apparatus includes means for routing network data.

6. An apparatus comprising:
   an interface for interfacing with a PSTN/ISDN line; and
   a processor configured to receive, recognize, and process a caller identification sequence (CID sequence) to pre-configure or configure the apparatus,
   wherein the processor is further configured with a filter based upon a country/region where the CID sequence is being received,
   wherein the CID sequence includes settings allowing the apparatus to connect to the Internet, and
   wherein the CID sequence includes a Message Type ID recognizable as a provisioning message type by the processor and not recognizable as valid by a telephone on the PSTN/ISDN line.

7. An apparatus of a service provider, comprising:
   a caller identification sequence generator configured to provide a caller identification sequence (CID sequence) that includes pre-configuration or configuration data for a DSL apparatus; and
   a network interface for transmitting the CID sequence to the DSL apparatus via a PSTN/ISDN line,
   wherein the CID sequence includes settings allowing the apparatus to connect to the Internet,
   wherein the CID sequence includes a generic numeric identifier associated with the service provider, and
   wherein the CID sequence includes a Message Type ID recognizable as a provisioning message type by a caller identification detector in the DSL apparatus and not recognizable as valid by a telephone on the PSTN/ISDN line.

8. The apparatus of claim 7, wherein the caller identification sequence is formatted using the multiple data message format (MDMF).

9. The apparatus of claim 7, wherein the caller identification sequence is associated with a Message Type ID not defined in the ETSI TR 101 292 standard.

10. The apparatus of claim 7, wherein the caller identification sequence includes a server IP address.

11. The apparatus of claim 7, wherein the caller identification sequence is transmitted based on a time schedule.

12. The apparatus of claim 7, further comprising a database for managing a plurality of caller identification sequences.

13. An apparatus of a service provider, comprising:
   means for providing a caller identification sequence (CID sequence) that includes pre-configuration or configuration data for a DSL apparatus; and
   means for transmitting the CID sequence to the DSL apparatus via a PSTN/ISDN line,
   wherein the CID sequence includes settings allowing the apparatus to connect to the Internet,
   wherein the CID sequence includes a generic numeric identifier associated with the service provider, and
   wherein the CID sequence includes a Message Type ID recognizable as a provisioning message type by a caller identification detector in the DSL apparatus and not recognizable as valid by a telephone on the PSTN/ISDN line.

14. The apparatus of claim 13, further comprising means for managing a plurality of caller identification sequences.

15. A method for provisioning a DSL apparatus via a PSTN/ISDN line, the method comprising:
   contacting a service provider network via a PSTN/ISDN line;
   receiving a caller identification sequence (CID sequence) that includes pre-configuration or configuration data for the DSL apparatus from the service provider network; and
   filtering the CID sequence based upon a country/region where the CID sequence is being received,
   wherein the CID sequence includes settings allowing the DSL apparatus to connect to the Internet, and
   wherein the CID sequence includes a Message Type ID recognizable as a provisioning message type by a caller identification detector in the DSL apparatus and not recognizable as valid by a telephone on the PSTN/ISDN line.

16. The method of claim 15, further comprising pre-configuring or configuring the DSL apparatus using the pre-configuration or configuration data from the caller identification sequence.

17. A method for provisioning an apparatus via a PSTN/ISDN line, the method comprising:
- generating a caller identification sequence (CID sequence) that includes pre-configuration or configuration data for a DSL apparatus; and
- transmitting the CID sequence to the DSL apparatus via a PSTN/ISDN line,
- wherein the CID sequence includes settings allowing the apparatus to connect to the Internet,
- wherein the CID sequence includes a generic numeric identifier associated with a service provider, and
- wherein the CID sequence includes a Message Type ID recognizable as a provisioning message type by a caller identification detector in the DSL apparatus and not recognizable as valid by a telephone on the PSTN/ISDN line.

18. The method of claim 17, wherein the caller identification sequence is formatted using the multiple data message format (MDMF).

19. The method of claim 17, wherein the caller identification sequence is associated with a Message Type ID not defined in the ETSI TR 101 292 standard.

20. The method of claim 17, wherein the caller identification sequence includes a server IP address.

21. The method of claim 17, further comprising managing a plurality of caller identification sequences.

22. The method of claim 17, wherein the caller identification sequence is transmitted based on a time schedule.

* * * * *